United States Patent
Wermeister

(10) Patent No.: US 6,939,091 B2
(45) Date of Patent: Sep. 6, 2005

(54) CUTTING INSERT FOR CAMSHAFT MILLING CUTTERS

(75) Inventor: Günter Wermeister, Meerbusch (DE)

(73) Assignee: Sandvik AB, Sandviken (SE)

(*) Notice: Subject to any disclaimer, the term of this patent is extended or adjusted under 35 U.S.C. 154(b) by 292 days.

(21) Appl. No.: 10/257,112

(22) PCT Filed: Apr. 3, 2001

(86) PCT No.: PCT/EP01/03768

§ 371 (c)(1),
(2), (4) Date: Feb. 21, 2003

(87) PCT Pub. No.: WO01/76796

PCT Pub. Date: Oct. 18, 2001

(65) Prior Publication Data

US 2003/0165363 A1 Sep. 4, 2003

(30) Foreign Application Priority Data

Apr. 8, 2000 (DE) .......................................... 100 17 645

(51) Int. Cl.⁷ ............................................. B23B 27/22
(52) U.S. Cl. ..................... 407/113; 407/48; 407/114; 407/115; 407/103
(58) Field of Search .................... 407/48, 100, 103, 407/113, 114, 115, 116, 34, 42

(56) References Cited

U.S. PATENT DOCUMENTS

| | | | | |
|---|---|---|---|---|
| 4,111,589 A | * | 9/1978 | Goeke | ....................... 407/114 |
| 4,611,516 A | * | 9/1986 | Hochmuth et al. | ............ 82/1.2 |
| 5,454,671 A | * | 10/1995 | Qvarth | ......................... 407/42 |
| 5,460,464 A | * | 10/1995 | Arai et al. | ................... 407/114 |
| 5,893,401 A | * | 4/1999 | Eriksson | ................... 144/208.8 |
| 6,273,651 B1 | | 8/2001 | Heinloth et al. | |
| 6,374,712 B1 | | 4/2002 | Jaeger et al. | |

FOREIGN PATENT DOCUMENTS

| | | |
|---|---|---|
| DE | 38 24 348 | 4/1992 |
| DE | 43 30 668 | 3/1995 |
| EP | 0 873 808 | 10/1998 |

* cited by examiner

*Primary Examiner*—Willmon Fridie, Jr.
(74) *Attorney, Agent, or Firm*—Burns, Doane, Swecker & Mathis, L.L.P.

(57) ABSTRACT

A cutting insert for milling cam shafts includes first and second surface interconnected by a third surface, and at least one cutting edge. The cutting edge includes a straight first cutting edge section, a straight second cutting edge section, and a generally convex third cutting edge section, all adjoining one another. The first section extends along the junction between the first and third surfaces. The second section extends along the junction and includes a first end adjoining an end of the first section. The second is inclined at an obtuse angle from one end of the first section in a direction away from the third surface. The third section extends along the junction and adjoins a second end of the second section. The third section is of generally convex shape and extends over an angular range greater than 90°. The first, second and third sections lie in the third surface.

25 Claims, 7 Drawing Sheets

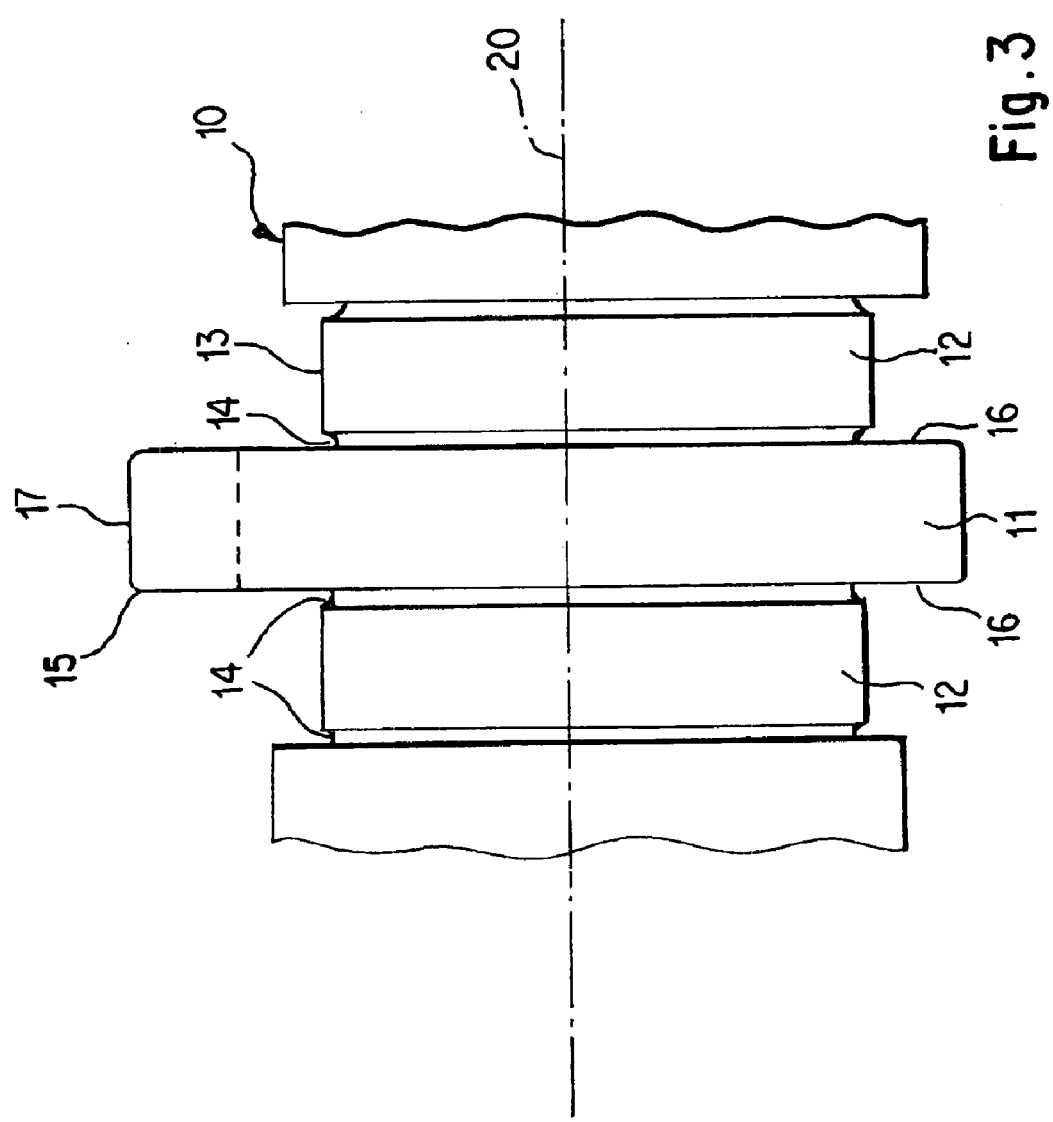

Figure 1:
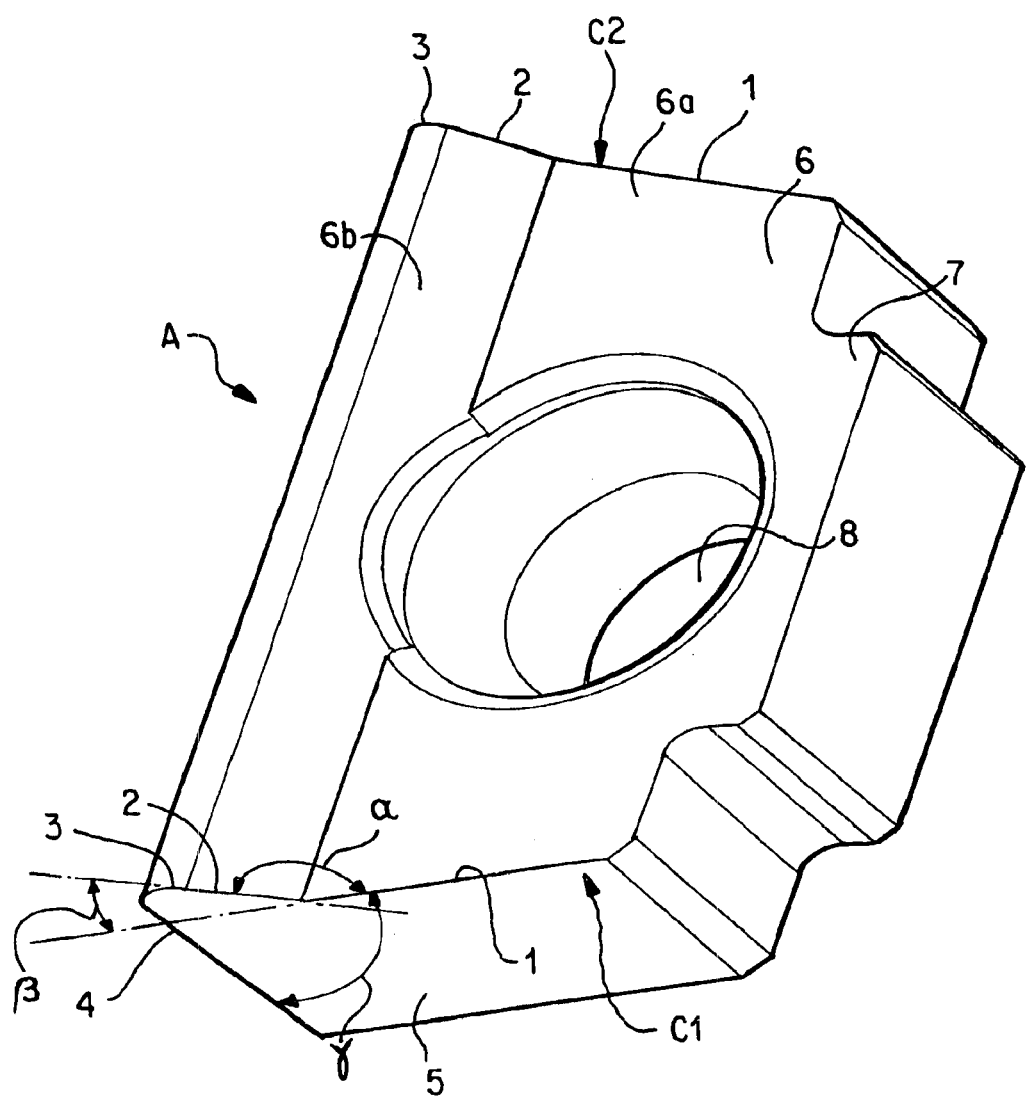

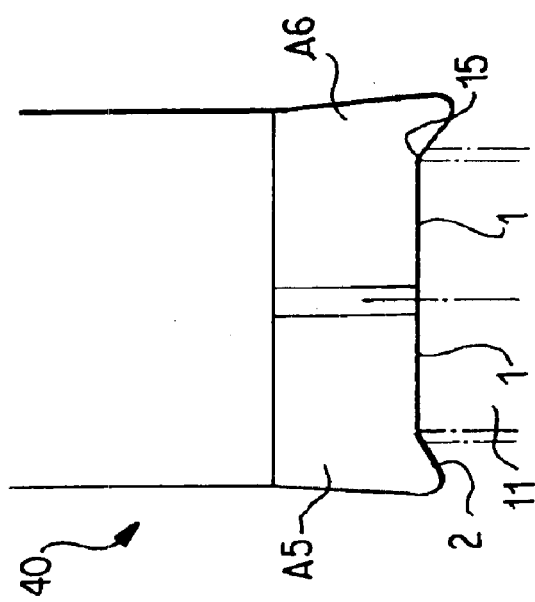
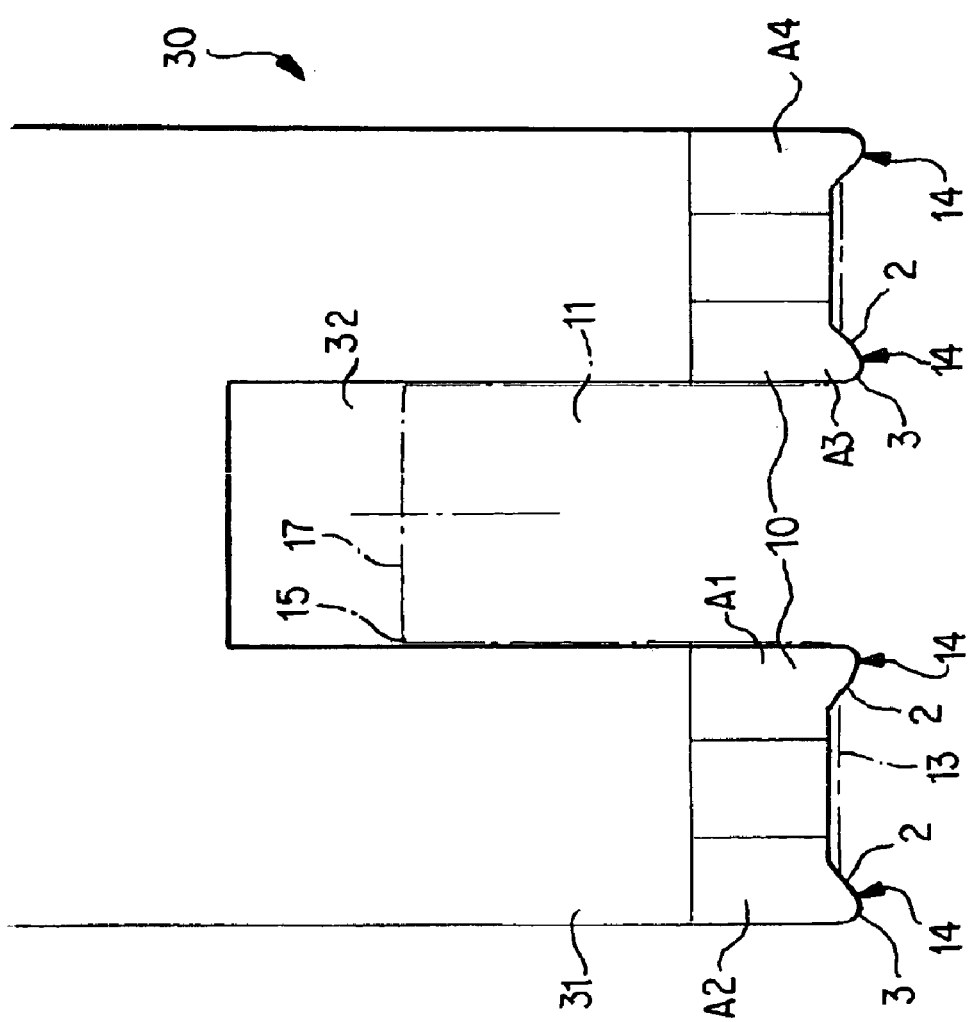
Fig. 4b
Fig. 4a

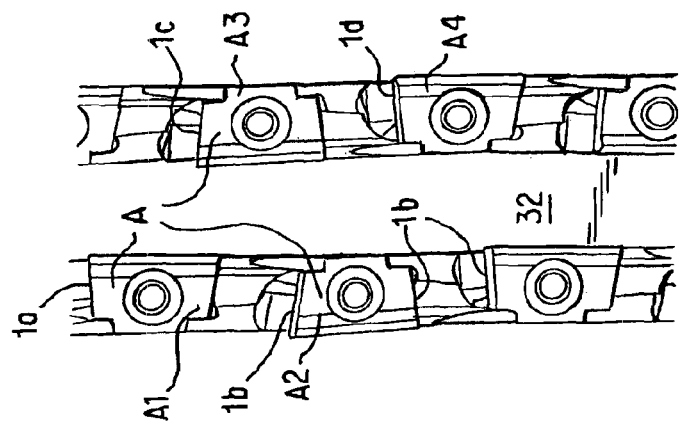
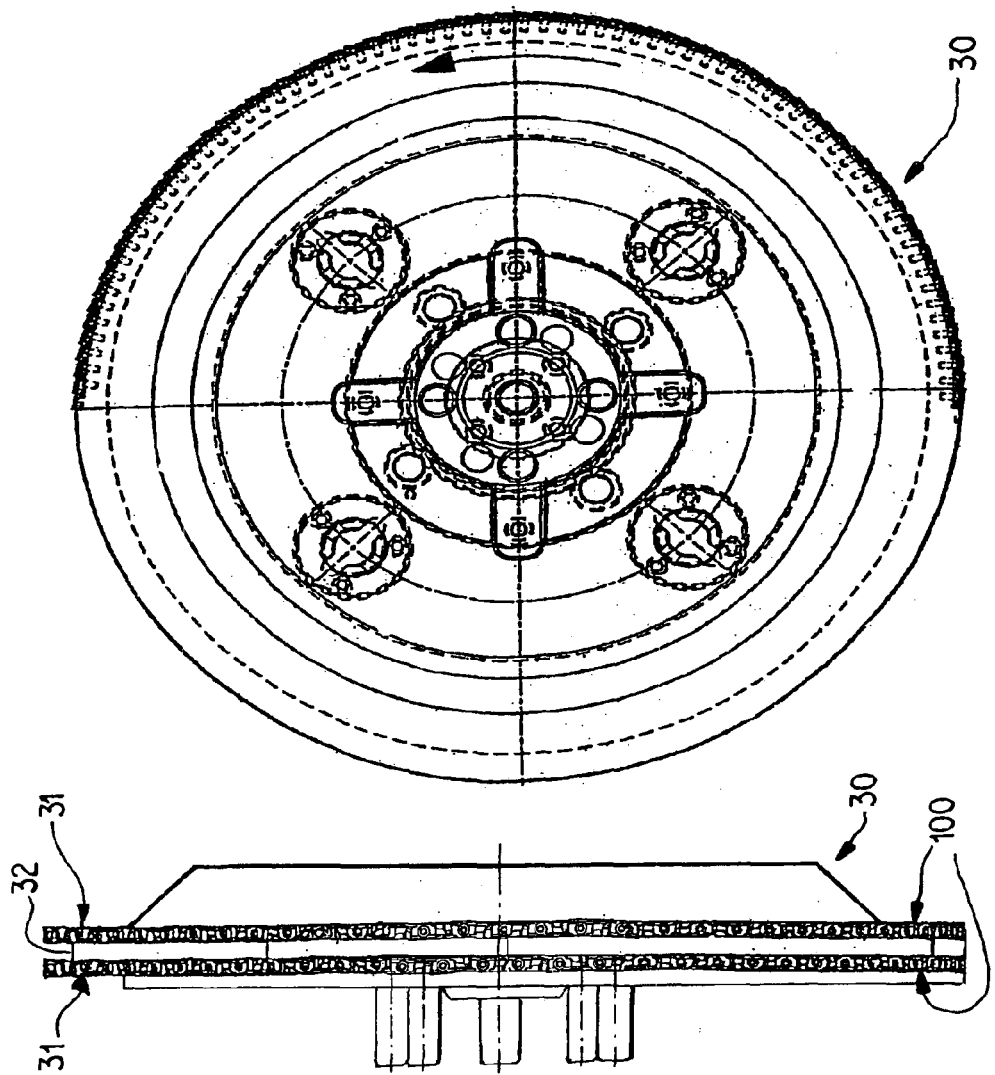
Fig. 5c
Fig. 5a
Fig. 5b

CUTTING INSERT FOR CAMSHAFT MILLING CUTTERS

BACKGROUND

The present invention relates to a cutting insert, in particular for milling camshafts, with at least one cutting edge composed of several sections. Such cutting inserts have been known in principle for a long time.

The manufacture of camshafts is usually done conventionally in that a camshaft is firstly cast in a mould, wherein the cast camshaft nevertheless does not yet possess sufficient accuracy in its dimensions for it to be used as a camshaft. The camshaft thus manufactured, cast with excess dimensions, is therefore subjected to further stages of finishing. Parts of the camshaft, in particular journals thereof, have an exact circular or cylindrical shape, and a common axis. These parts are as a rule worked or manufactured on a suitable lathe by turning. The cam contours are subsequently milled with so-called disc milling cutters about the periphery of which a large number of cutting inserts are arranged, the combined cutting edge profile of which corresponds in its entirety to the cross-section profile of a cam, wherein the disc milling cutter is advanced to the corresponding cam and the camshaft then completes a 360° rotation, wherein according to the path of the cam, the gap between the milling cutter axis and the axis of the camshaft is varied so that overall the desired cam contour is produced in a cutting plane perpendicular to the axis of the camshaft. The contour of the cam in a cutting plane that includes the axis of the camshaft is determined by the contour of the cutting edges on the disc milling cutter. The cylindrical coaxial sections of the camshaft remain unworked or are subsequently finished by grinding. Thus, after casting the camshaft, a total of at least three different stages of working, on three different machines, and corresponding loading of machines is necessary to manufacture a camshaft in the conventional manner.

A method has recently been developed by means of which the procedure of rotating of cylindrical, concentric sections is omitted, and instead these cylindrical sections are also manufactured with the aid of disc milling cutters, the cutting inserts of which are configured and arranged such that they shape parts of the contour of these cylindrical sections as well as the end faces of the cams, again seen in a formation that includes the axis of the camshaft. In this way, parts of the cylindrical sections as well as the cam contours of the camshaft can be manufactured in a single loading on the same milling machine. The remaining parts of the cylindrical sections are exclusively ground or remain raw and unworked.

As the cams extend further out radially than the cylindrical sections of the camshaft, for accurate finishing of the cylindrical sections by grinding, undercuts must be manufactured in the corner areas in the transition between the cylindrical section and an adjacent cam, that is to say small groove-like indentations in the corner areas, so that the cylindrical sections can be manufactured in an accurately defined manner. With this working procedure, the end faces of the cams must additionally be manufactured or worked, which is conventionally done by turning. On the other hand, with this milling procedure, the cylindrical surfaces themselves do not necessarily have to be manufactured as they have only a small over-measurement, and can also be fabricated directly by grinding. Consequently, the cutting inserts for flat milling of the cam end faces as well as the manufacture of undercuts on the cylindrical coaxial surfaces of the camshaft have to have a completely different contour and have a different cutting edge path than for manufacturing the cam contour. Thus, at first glance it is necessary to equip the different milling cutters used on the one hand for manufacturing the undercuts in the corners areas of the cylindrical sections, and the end faces of the cams, with different cutting inserts than the milling cutters that manufacture the cam contour. As these milling cutters are disc milling cutters with a relatively large diameter, along the periphery of which as large a number as possible of cutting inserts is arranged in order to obtain as long an uninterrupted operating time as possible with one disc milling cutter, this obviously means a very high consumption of cutting inserts when the cutting edges of the inserts of a milling cutter are worn out.

With respect to this prior art, the object of the present invention is to provide a cutting insert, the use of which will allow considerable savings to be obtained.

SUMMARY OF THE INVENTION

This object is solved by a cutting insert comprising first and second end surfaces interconnected by a third surface, and at least one cutting edge which comprises:

a straight first cutting edge section extending along a junction between the first and third surfaces, a straight second cutting edge section extending along the junction and including a first end adjoining an end of the first cutting edge section, the second cutting edge section inclined at an obtuse angle from one end of the first cutting edge section in a direction away from the third surface, and a third cutting edge section extending along the junction and adjoining a second end of the second cutting edge section, the third cutting edge section being of generally convex shape and extending over an angular range greater than 90°.

wherein the first, second and third cutting edge sections lie in the third surface.

By means of this cutting edge contour, one and the same insert can be used a plurality of times, and in particular can be used both for manufacturing the cam contour and for manufacturing the undercuts on the cylindrical camshaft sections, as well as for working the cam end faces.

According to the invention, in plan view of the associated face, the cutting edge is composed of a first, straight cutting edge section, a second straight cutting edge section adjoining it, which forms an obtuse angle of more than 90°, but less than 180° with the first, straight cutting edge section, and lastly a convex, round cutting edge section adjoining the second, straight cutting edge section, the angle of curvature of which extends over an angular range of more than 90°. The second, straight cutting edge section and the third, round cutting edge section together define a kind of nose-like projection that adjoins the end of the first, straight cutting edge section. With this contour, it is possible to use one cutting insert for both a milling cutter that manufactures the undercut on the cylindrical camshaft sections and the end faces of the cams and a milling cutter that manufactures the actual cam contour. The cutting inserts can thus first be used on a disc milling cutter, wherein in order to manufacture the undercut and the end faces of the cams practically only the nose-shaped contour of the cutting edges of the cutting inserts are employed, and after these cutting edge areas are worn out, the same cutting insert can be used on a disc milling cutter that manufactures the actual cam contour, wherein the first, straight cutting edge section and the part of the second, straight cutting edge section directly adjoining it is then used, which manufactures another chamfer along the external edges of the cam. Although all the cutting edge sections described must be present on each cutting insert while in using different types of cutting inserts only a part of the cutting edges is needed, in this way a unitary type of cutting insert can be used that can be manufactured in correspondingly greater numbers, is replaceable as desired and that also has cost advantages compared to two different cutting inserts that would otherwise have to be manufactured instead of a single cutting insert according to the present invention. It must be emphasized that the different cutting edge areas that are used for undercutting and manufacturing the end faces as well as for manufacturing the cam contour wear out at approximately the same rate.

An embodiment of the cutting insert according to the invention is particularly preferred wherein the angular range $\gamma$ over which the curved cutting edge section extends is approximately the sum of 90° and the complementary angle that is produced from the difference between 180° and the angle $\alpha$ between the first and second straight cutting edge sections. When the angle 90+$\beta$ corresponds exactly to the angle of curvature of the curved cutting edge section, a straight auxiliary cutting edge section also adjoining the curved section runs exactly perpendicular to the first, straight cutting edge section. When the angle of curvature is somewhat greater than 90+$\beta$, an angle $\delta$ is produced between this third, straight cutting edge section forming an auxiliary cutting edge and the first, straight cutting edge, which angle is less than 90° and should preferably be between 80 and 90°, in particular approximately 87°. There are nevertheless other preferred embodiments wherein this angle $\delta$ is exactly 90°.

The angle $\alpha$ between the first and the second straight section should preferably be between 120 and 160°, more preferably between 130 and 155°, and in particular between 145 and 150°, which corresponds to angling of the chamfer surface of a cam contour with respect to the peripheral surface of the cam by 30 to 35°.

In order to obtain as uniform wear as possible of all the cutting edge sections with the widest variety of operating procedures, the nose-shaped cutting edge projection advantageously overall has a length, measured in the direction of the first straight section, that is between ⅓ and ⅔ the length of the first section, preferably in the range of 40 to 50% of the length of the first cutting edge section. The second, straight cutting edge section, considered on its own, should have a length that is less than 40% of the length of the first straight section, in particular approximately in the range of 30 to 35% of the first, straight section.

The radius of curvature of the curved cutting edge section is preferably in the range between 0.1 mm and 5 mm, in particular between 0.2 and 1.5, and particularly preferably between 0.3 and 0.8 mm. Clearly, the form of this curved cutting edge can also be approximated by cutting edge portions, sections of which are straight, that are angled relative to one another, and can be approximated by means of a correspondingly curved cutting edge form with the radii of curvature described.

In order to be able to design the use of the cutting insert according to the invention yet more economically, an embodiment is preferred wherein at least two cutting edges are provided that are configured in mirror image to one another, and that have a common flank, however are formed by the section with two different faces provided on opposite sides of the cutting insert. These faces are not parallel to one another in the preferred embodiment of the invention, but instead form a small angle of between 5 and 30°, in particular between 10 and 20° to one another. In manufacturing the undercut and the end faces of the cams, this means that the chippings are moved away from the cams as the outer part of the round cutting edge section and the adjoining auxiliary cutting edge obtain a positive cutting geometry in this way.

In a particularly preferred embodiment of the invention, moreover, a further mirror-image cutting edge can also be arranged on the same face, wherein in the combination with the mirror-image arrangement of a cutting edge on the same flanks, there can be four identical cutting edges altogether, two of which are arranged in mirror image to one another that are in any case required for manufacturing the undercuts and cam contour. Where there is the mirror-image configuration of cutting edges on the same face, the auxiliary cutting edge should preferably be at angle of 90° to the first, straight cutting edge section, and the two auxiliary cutting edges of the cutting edges arranged in mirror-image to one another on the same face then merge into one another. The cutting insert has then to be mounted on the disc milling cutter in a slightly inclined arrangement so that the auxiliary cutting edge does not engage over the whole of its length with the end face of a cam, but at most is active on the front part of the auxiliary cutting edge adjoining the curved section. However, the two opposite faces can also optionally form a small angle to one another instead of being configured parallel. This small angle could be in the range between 2 and 10°, in particular approximately 6°±2°. In this case, the angle between the first, straight cutting edge section and the auxiliary cutting edge would again be smaller than 90°. In this case too, the cutting insert would have to be mounted in a slightly inclined arrangement on the periphery of a disc milling cutter.

Figure 2A:
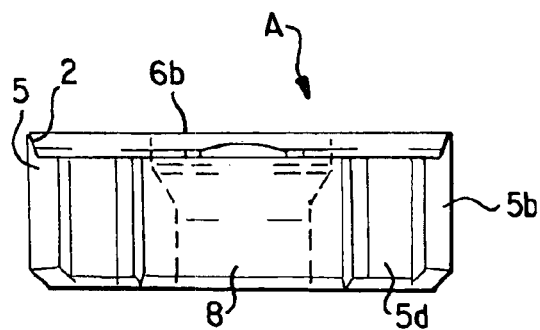
Figure 2B:
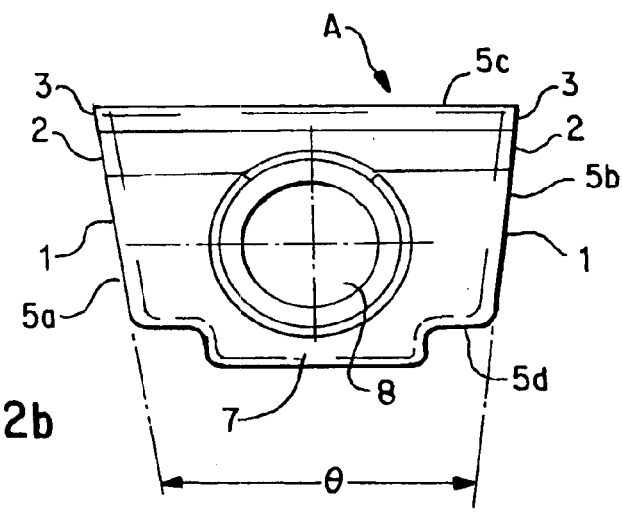
Figure 2C:
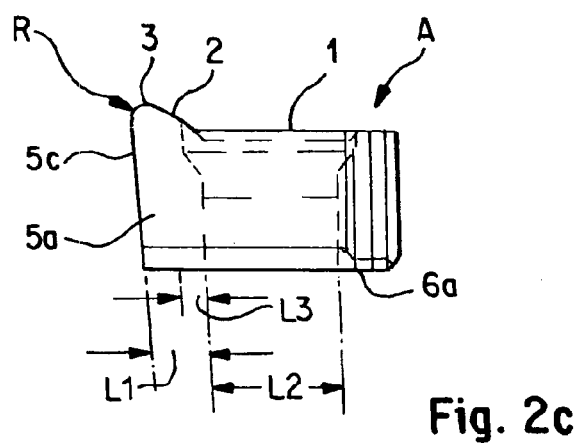

Further advantages, features and possibilities for application of the present invention will be evident from the following description of preferred embodiments and the associated Figures. There is shown, in:

FIG. 1: a perspective view of a first embodiment of a cutting insert according to the present invention, FIG. 2a: a rear side elevational view of the cutting insert according to FIG. 1, FIG. 2b: a top plan view of the insert according to FIG. 1, FIG. 2c: a side elevational view of the insert according to FIG. 1, FIG. 3 a section of a camshaft that is to be manufactured with the cutting inserts according to the invention, FIG. 4a: a sectional profile of the edge of a first type of disc milling cutters equipped with cutting inserts according to the invention, for manufacturing cam shafts, FIG. 4b: a sectional profile of a second type of disk milling cutter equipped with cutting inserts according to the invention, for manufacturing cam shafts, FIG. 5a: a top views of a disc milling cutter for manufacturing undercuts and end faces, as shown in FIG. 3, FIG. 5b: a side elevation view of the disc milling cutter shown in FIG. 5a.

FIG. 5c: an enlarged fragmentary view of FIG. 5b.

Figure 6C:
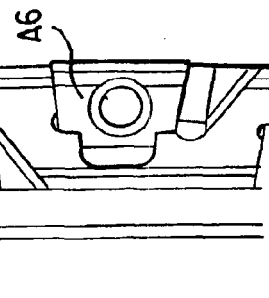
Figure 6A:
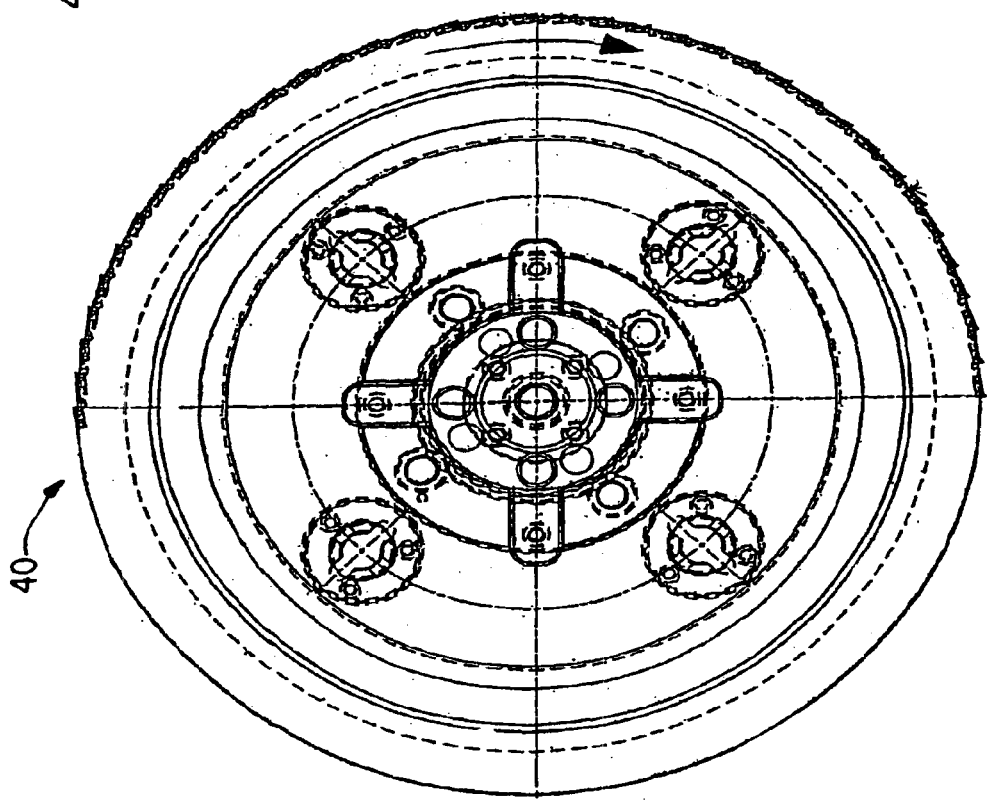
Figure 6B:
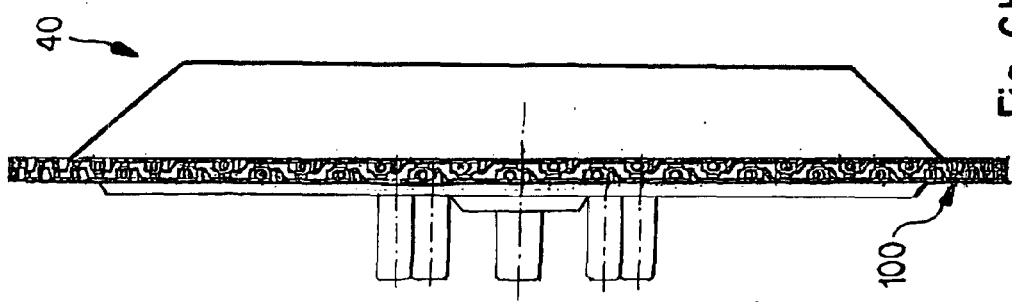
Figure 7:
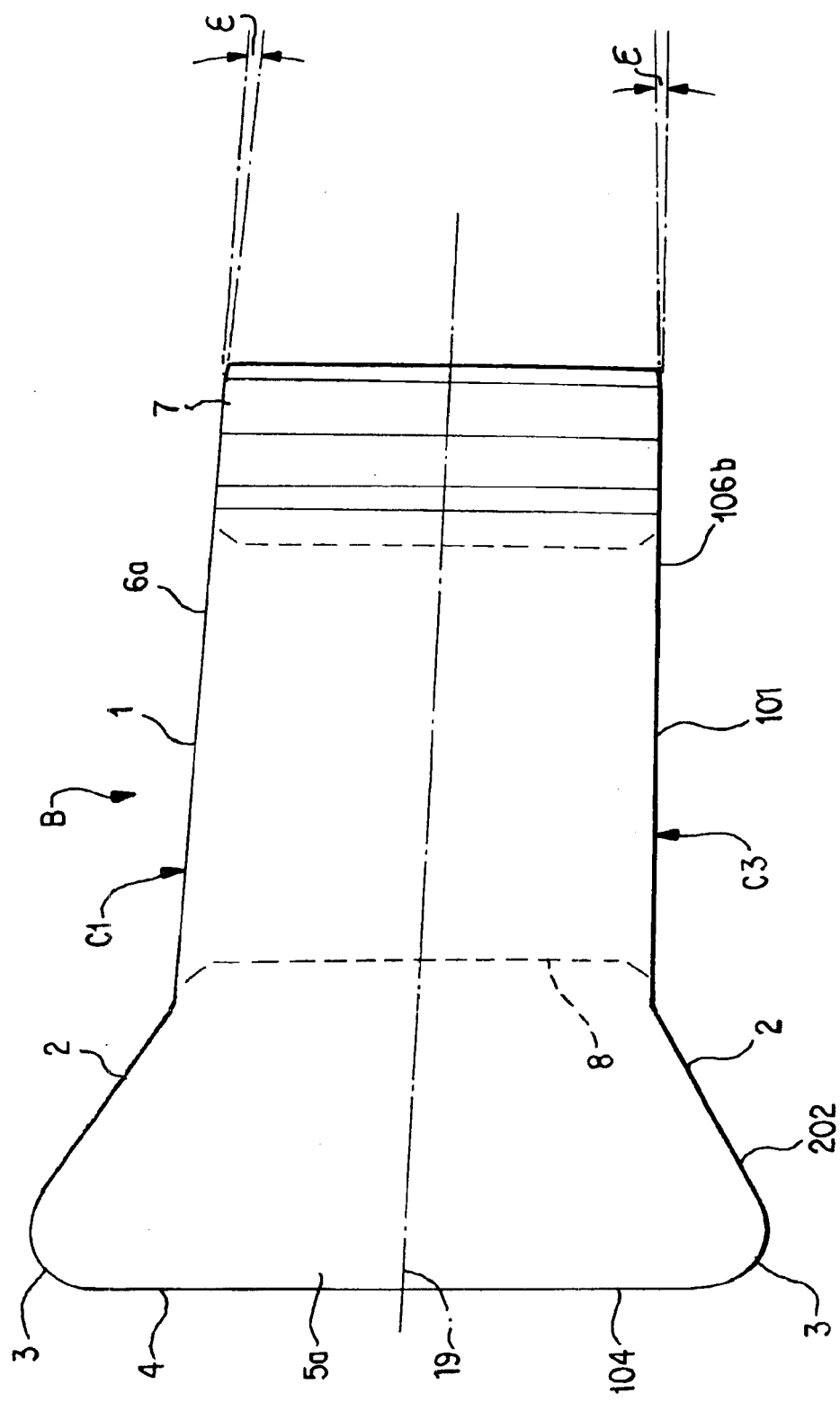

FIG. 6a: a top elevation view of the disc milling cutter depicted in FIG. 5b for manufacturing a cam contour shown in FIG. 3, FIG. 6b: a side elevation view of the disc milling cutter shown in FIG. 6a, FIG. 6c: an enlarged fragmentary view of FIG. 6a, FIG. 7: a plan view of the face of an alternative embodiment of a cutting insert that is configured symmetrically with respect to a central plane parallel to the flank 6, and thereby is provided with two additional cutting edges compared to the embodiment according to FIGS. 1 and 2.

DESCRIPTION OF PREFERRED EMBODIMENTS OF THE INVENTION

FIG. 1 shows a perspective view of a first embodiment of a cutting insert A according to the present invention. Roughly approximated, the cutting insert is square, but with some deviations from this basic shape that will be explained hereinafter. The insert comprises a number of surfaces including a top flank 6, a bottom flank 6a and peripheral edge surfaces 5a–5d. Two opposite ones of the peripheral edge surfaces 5a, 5b of the square that are not exactly parallel, but are inclined towards one another at an angle of 16° form faces that adjoin cutting edges 1, 2, 3 that are formed by the transition between the face 5a and the top flank 6 substantially perpendicular thereto. A fixing bore 8 extends perpendicular to, and passes through, the flank 6, which bore is provided for receiving a screw or a screw head for fastening the cutting insert to a milling tool.

The flank 6 is not a complete planar surface, but instead, in addition to a planar section 6a along an edge extending between the opposite faces 5b, is provided with a bead-like projection 6b with a nose-shaped cross-section, which results in an appropriate shape of the two opposite cutting edges C1, C2 that are each composed of a first straight cutting edge section 1, and adjoining it a second, also substantially straight cutting edge section 2 that is inclined with respect to the first, straight cutting edge section 1, and a convex, curved third cutting edge section 3 adjoining the second, straight cutting edge section. The second cutting edge section is inclined at an obtuse angle ∝ relative to the first section in a direction away from the bottom flank 6a. The angle of curvature over which the round cutting edge section 3 extends is dimensioned such that an auxiliary fourth cutting edge 4 tangentially adjoining the end of the curved section 3 extends substantially perpendicular to the first, straight cutting edge section 1, wherein the angle between the auxiliary cutting edge and straight cutting edge section 1 is preferably still somewhat less than 90° and is, for example, 87°. The first, second, and third cutting edge sections extend along a junction between the top flank 6 and the peripheral edge surface 5. The auxiliary cutting edge 4 is formed by the transition between the face 5 and another one of the peripheral edge surface 5c of the "square" that represents the basic shape of the cutting edge. The edge surface 5d opposite to this edge surface 5c is provide with a projecting section 7 that substantially has the purpose of ensuring sufficient tensile strength of the cutting insert with, at the same time, the ability to provide a correspondingly large dimensioned fixing bore 8, wherein the diameter of the fixing bore 8 has in turn to be dimensioned sufficiently large so that the fastening screw to be used therein has enough strength to securely retain the cutting insert in its place during the cutting forces that occur. Clearly, the projection 7 can be omitted without any problem, in that, for example, either the fixing bore 8 is made smaller in relation to the size of the cutting insert, or the faces 5a, 5b are correspondingly lengthened, the projection 7 thus being included in the approximately square shaped basic design which would lead to using more hard metal material, and the cutting edge section 1 would be lengthened beyond the actual dimension required.

FIGS. 2a to c show the cutting insert shown in perspective in FIG. 1 in a view from the right towards the projection 7 (FIG. 2a) in a plan view of the flank 6 from above (FIG. 2b) and in a view towards a face 5a (FIG. 2c), As the structures of camshafts are relatively small, the cutting inserts according to the invention must also be correspondingly small. On the other hand, with disc milling cutters where the cutting inserts are fastened along the periphery of a disc milling cutter and the active cutting edges are effective on the periphery of the disc milling cutter, it is generally essential that the cutting inserts are mounted and fastened with fixing screws and must also have a corresponding fixing bore for this purpose. Because of the considerable cutting forces that additionally still act more or less as a shock upon the individual cutting inserts during milling, a certain minimum diameter is indispensable for the fixing screws to be used and consequently also for the corresponding fixing bores of the cutting inserts. FIG. 2a shows in broken lines the contours of the corresponding fixing bore while to the right and left the two faces 5a, 5b and at the top the bead-like bump 6b of the flank 6 are shown. In the plan view of the flank 6 according to FIG. 2b the relatively large fixing bore is shown again, and it is further evident that the projection 7 on the cutting insert provides additional material that gives the cutting insert sufficient strength despite the large fixing bore. In this view it is particularly clear that the faces 5a, 5b do not run parallel to one another nor perpendicular to the adjacent edge surfaces, but they are inclined with respect to these edge surfaces and symmetrically to one another, and in the embodiment shown, form an angle θ of 5 to 30 degrees, or 10 to 20 degrees, or approximately 16±2 degrees with respect to one another in concrete terms, The inclination of the face 5a (or 5b) to the respective adjacent edge surface 5c or 5d varies from a 90° angle respectively by approximately 8°.

Lastly in FIG. 2c there is very clearly shown the cutting edge contour essential to the present invention. There is shown the first, straight cutting edge section 1, the second, straight cutting edge section 2 that forms an angle ∝ of approximately 150° with the first cutting edge section, adjoining the second, straight cutting edge section a round, cutting edge section 3 that extends over an arc (i.e., angular range) of approximately 120° or somewhat further, so lastly an auxiliary cutting edge 4 forms an angle y of 87° with the first, straight cutting edge section. This slight inward inclination of the auxiliary cutting edge 4 has the purpose of leaving a clearance angle of approximately 3° below the outermost active corner of the round cutting edge 3 that works the end faces of cams, so that not the entire surface of the auxiliary cutting edge 4 engages with the end face of a cam being machined. However, the same effect could also be achieved if the auxiliary cutting edge extended substantially perpendicular to the first, straight cutting edge section, and the cutting insert were mounted simply angled by approximately 3° on the periphery of the milling cutter.

The nose-shape cutting edge projection 2, 3 advantageously overall has a length, L1 measured in the direction of the first straight section (see FIG. 2c), that is between ⅓ and ⅔ the length L2 of the first section, preferably in the range of 40 to 50% of the length L2 of the first cutting edge section. The second, straight cutting edge section 2, considered on its own, should have a length L3 that is less than 40% of the length L2 of the first straight section, in particular approximately in the range of 30 to 35% of the first, straight section.

FIG. 3 shows a typical section of a camshaft 10 with a cam 11 and two cylindrical camshaft sections 12 adjoining said cam 11 on either side, and further, following sections that are shown cut away in this representation. In plan view along the axis 20 the cam 11 inevitably does not have a circular outline, but instead a more or less oval or egg-shaped outline in order to be suitable to act as a cam. The camber of the cam, that is to say the difference between the smallest and largest radial distance of the peripheral surface of the cam 11 from the axis 20, is indicated by an additional broken line.

The corner areas of the cylindrical section 12 at the transition to the cam end faces 16 and also at the transition to further adjoining parts of the camshaft are provided with so-called "undercuts" 14 by means of which undefined corner areas are avoided which could otherwise occur when grinding the peripheral surface 13 of the cylindrical shaft section 12. The camshaft is generally manufactured as a cast piece wherein all the sections of the camshaft are provided with a slight over-size and their final, accurate, shape is only obtained through milling and other finishing procedures. In the present case, all the contours, with the exception of cylindrical surfaces 13, are manufactured by milling. Reference is additionally made to FIG. 4 in order to describe the processing.

In FIG. 4a, 4b, the contours of the edge areas of two milling cutters 30, 40, respectively are shown in section. As can be seen, the milling cutter 30 is composed of two disc milling cutters 31, 31' permanently fixed to one another, or in other words, of a disc milling cutter with a continuous groove 32 provided along its periphery for receiving a cam 11. The two disc sections 31, 31' placed to the right and left of the groove 32 are respectively fitted with cutting inserts A according to the invention, the straight cutting edge sections 1 of which overlap by a considerable portion, as can be seen in FIG. 5c. Clearly, the individual cutting inserts of each disc section do not lie in the same plane, but are arranged one behind another in the direction of the periphery, and alternately such that with one cutting insert A1, the cutting edge 1a that can be seen in FIG. 5c engages, while the next cutting insert A2 is turned around by 180° with respect to it (around the axis of the bore 8) so that the cutting edge 1b thereof shown in FIG. 5c engages, which results in the second, inclined cutting edge section 2 and also the round cutting edge section 3, lying alternately on the right and on the left on a disc milling cutter. In FIG. 4a, the contour of a cam 11 is indicated in the centre of the groove 32, and below, in broken lines the contour of the cylindrical peripheral surface 13 of a cylindrical section 12 is also shown. Also shown are the four inserts A1–A4. As can also be seen, the undercuts 14 are produced by means of the nose-shaped projections of the cutting edges that are formed by the round cutting edge section 3 and the second, straight cutting edge section 2. Moreover, the outer area of the round cutting edge section 3 wears away the over-size of the end faces 16 of the cam 11. As the milling cutter 30 is in practice composed of two disc milling cutters joined together, in this way the undercuts on two cylindrical shaft sections 12 adjacent to the cam 11 are manufactured at the same time, and also at the same time both end faces 16 of the cam 11 are worked and brought to their final dimensions. As can be seen from FIG. 4a, in total, only the round cutting edge section 3 and a more or less large portion of the second, straight cutting edge section 2 of each insert come into engagement with the camshaft, that is to say only these cutting edge portions experience wear and tear in this first milling procedure.

The milling cutter 40 is composed of a single disc milling cutter on which exactly the same cutting insert A (designated A5 and A6) according to the present invention manufactures the actual cam contour, that is to say the peripheral surface of the cam 11. In this case the straight cutting edge sections 1 overlap only slightly, as is evident, and only the part of the two straight cutting edge sections 2 directly adjoining the first section 1 is used to manufacture a chamfer 15 along the edges at the transition between the peripheral surface and end face 16 of the cam 11. In other words, when the milling cutter 40 is employed, precisely those sections of the cutting edge of the cutting inserts are used that remained unused during use on the milling cutter 30 according to the illustration of FIG. 4a. In manufacturing the camshaft, for example, the milling cutter 30 can be moved from the one side radially in the direction of the axis 20 of the camshaft, wherein the camshaft 10 carries out a rotation that is slow in comparison to the rotation of the milling cutter, while the milling cutter 2 is fed in from the opposite side radially in the direction of the cam, and during working of the cam surface according to the desired cam contour, varies the distance from the axis 20 of the camshaft.

When cutting inserts are to be used that have only cutting edge portions that are necessary just for a single use, these nevertheless have to have a certain size so that a sufficiently dimensioned fixing bore can be fabricated for the fixing screws described hereinabove.

When, after a suitable number of working procedures the respectively used cutting edge sections are worn out, the cutting inserts of the milling cutter 30 can be exchanged for the cutting inserts of the milling cutter 40, so the cutting edge sections that are as yet unworn are brought into use. In this manner, the efficacy of each individual cutting insert is practically doubled.

Clearly before exchanging the two milling cutters 30 and 40, the individual cutting inserts are indexed to deploy fresh cutting edges. That is, the inserts on each milling cutter itself are firstly turned around again by 180° and exchanged in pairs, so that the cutting edges still remaining unused on the face 5a or 5b are brought into use.

In FIGS. 5a–5c and 6a–6c different views of the milling cutter 30, 40 brought into use are again shown. FIG. 5a shows an axial plan view of a disc milling cutter 30 for manufacturing the undercut 14 on the cylindrical sections 12 and the cam end faces 16. In FIG. 5a there is a plan view in the axial direction, wherein in the right-hand half, a plurality of cutting inserts arranged one behind another can be seen. FIG. 5b shows a plan view of the periphery of the disc milling cutter 30 that is effectively composed of two disc milling cutters arranged relatively close to one another that can be in a single piece or joined together in another manner. FIG. 5c shows an enlarged section of the plan view according to FIG. 5b. It is evident that the individual cutting inserts are arranged alternately turned around by 180° with respect to one another along the periphery of the two disc portions, wherein the straight cutting edge section 1 of consecutive cutting inserts largely overlap, while the end sections configured in the shape of a nose-shaped projection, composed of the second, straight section 2 and the round cutting edge section 3 are provided alternately on the left and right on a disc. The slight distance projected in this same plane between the active cutting edge portions between the two disc milling cutters defines the width or thickness of the individual cams, that is to say the distance between the opposite cam end faces 16.

In FIG. 6a–6c shows, in a manner completely analogous to FIG. 5a–5c, different views of the milling cutter 40 for manufacturing the cam contour. This milling cutter is composed of a single disc milling cutter, and in FIG. 6a this disc milling cutter is again shown equipped with a plurality of cutting inserts (in the right-hand half). FIG. 6b shows a plan view of the peripheral surface of the disc equipped with cutting inserts, and FIG. 6c is again a section from FIG. 6b. The arrangement of the cutting inserts is principally similar to that on a disc milling cutter of the milling cutter 30, however in this instance the straight cutting edge sections 1 only overlap slightly. The active working range is in this instance formed by the first, straight cutting edge section 1 and the directly adjacent portion of the second, straight cutting edge section 2.

In FIG. 7 a further advantageous embodiment of a cutting insert B according to the invention is shown, wherein the insert has two mirror-image cutting edges C1 and C3 along the junction formed by the face 5a (or 5b) with the top flank 6a and the bottom flank, now designated 106b. The cutting edge C1 is composed of cutting edge sections 1, 2 and 3 arranged symmetrically to one another on each of the faces 5a. The cutting edge C3 is composed of cutting edge sections 101, 102, and 103. The two flanks 6a, 106b and consequently also the two straight cutting edge sections 1, 101 can be inclined with respect to one another by a small angle ϵ of, for example, 6°. This enables a slightly inclined mounting of the cutting inserts, in particular in use on the milling cutter 30, so that the auxiliary cutting edge 4 or 104 does not engage with the cam end faces 16, or does so only at its area of direct transition with the round cutting edge section 3 or 103. At the same time, in this embodiment, by inclining the cutting edge section 1 it is not raised beyond a position axially parallel with respect to the milling cutter, so there is no danger that when using the milling cutter 30 the free end sections of the cutting edge portions 1 or 101 engage with the peripheral surface 13 of the cylindrical shaft sections 12. Also, when used on the milling cutter 40, the cutting inserts must then be mounted inclined at an angle of, for example 3°, so that the cutting edge sections 1 run axially parallel to the axis of the milling cutter (and thereby also to the axis of the camshaft).

Inclined mounting on the milling cutter 30 is possible, however, when the two cutting edges (on the same face) run exactly parallel as long as the angle of inclination is sufficiently small and the oversize of the surfaces 13 of the cylindrical shaft sections 12 is sufficiently small, so despite the inclination of the cutting edge sections 1 from the axially parallel orientation, the ends of these cutting edge sections 1 nevertheless engage with the surface 13.

The embodiment according to FIG. 7 has four double use cutting edges and thus yet further improves efficiency when using corresponding cutting inserts by a factor of 2. Nevertheless, the seat for the individual cutting inserts on the disc milling cutters must also be correspondingly configured so that the cutting edges respectively received in the seat are not stressed or damaged. A plane of symmetry is shown by the dashed line 19, with respect to which the upper half of the cutting insert is configured in mirror image to the lower half.

What is claimed is:

1. A cutting insert comprising first and second surfaces interconnected by a third surface, and at least one cutting edge comprising:
    a straight first cutting edge section extending along a junction between the first and third surfaces,
    a straight second cutting edge section extending along the junction and including a first end adjoining an end of the first cutting edge section, the second cutting edge section inclined at an obtuse angle from the end of the first cutting edge section in a direction away from the third surface, and
    a third cutting edge section extending along the junction and adjoining a second end of the second cutting edge section, the third cutting edge section being of generally convex shape and extending over an angular range greater than ninety degrees;
    wherein the first, second and third cutting edge sections lie in the third surface.

2. A cutting insert comprising top and bottom flanks interconnected by peripheral edge surfaces, and at least one cutting edge comprising:
    a straight first cutting edge section extending along a junction between the top flank and one of the peripheral edge surfaces;
    a straight second cutting edge section extending along the junction and including a first end adjoining an end of the first cutting edge section, the second section inclined at an obtuse angle from the end of the first section in a direction away from the bottom flank; and
    a third cutting edge section extending along the junction and adjoining a second end of the second cutting edge section, the third section being of generally convex shape and extending over an angular range greater than ninety degrees;
    wherein the first, second and third cutting edge sections lie in the one peripheral edge surface.

3. The cutting insert according to claim 2 wherein the angular range of the third cutting edge section is substantially equal to the sum of 90° and an angle which is complementary to the obtuse angle.

4. The cutting insert according to claim 2 wherein the angular range of the third section is greater than the sum of 90° and an angle which is complementary to obtuse angle.

5. The cutting insert according to claim 2 wherein the third cutting edge section is smoothly convexly curved, and the curvature has an average radius of curvature between 0.1 mm and 5.0 mm.

6. The cutting insert according to claim 5 wherein the average radius of curvature is between 0.1 and 1.5 mm.

7. The cutting insert according to claim 6 wherein the average radius of curvature is between 0.3 and 0.8 mm.

8. The cutting insert according to claim 2 wherein the obtuse angle is between 120 and 160 degrees.

9. The cutting insert according to claim 2 wherein the obtuse angle is between 130 and 155 degrees.

10. The cutting insert according to claim 9 wherein the obtuse angle is between 145 and 150 degrees.

11. The cutting insert according to claim 2 wherein a total length of the second and third cutting edge sections measured in a direction of the first cutting edge section is in the range of 1/3 to 2/3 of a length of the first cutting edge section.

12. The cutting insert according to claim 11 wherein the range is 40 to 50 percent.

13. The cutting insert according to claim 11 wherein a length of the second cutting edge section measured in a direction of the first cutting edge section is less than 40 percent of a length of the first cutting edge section.

14. The cutting insert according to claim 13 wherein the length of the second cutting edge section measured in a direction of the first cutting edge section is between 30 and 35 percent of a length of the first cutting edge section.

15. The cutting insert according to claim 2 wherein a length of the second cutting edge section measured in a direction of the first cutting edge section is less than 40 percent of a length of the first cutting edge section.

16. The cutting insert according to claim 2 wherein the peripheral edge surface constitutes a first peripheral edge surface; the third cutting edge section adjoining the second cutting section at a first end of the third cutting edge section; the cutting edge further including a straight fourth cutting edge section adjoining a second end of the third cutting edge section and extending along a junction between the first peripheral edge surface and a second of the peripheral edge surfaces, wherein the fourth cutting edge section lies in the first and second peripheral edge surfaces.

17. The cutting insert according to claim 16 wherein an angle formed between the first and fourth cutting edge sections is less than 90 degrees and greater than 80 degrees.

18. The cutting insert according to claim 2 further including a through-bore extending through the insert from the top flank to the bottom flank.

19. The cutting insert according to claim 2 wherein the cutting edge constitutes a first cutting edge, and the one peripheral edge surface constitutes a first peripheral edge surface, the insert including a second cutting edge configured as a mirror image of the first cutting edge and extending along a junction between the top flank and a second of the peripheral edge surfaces that faces away from the first peripheral edge surface; wherein the entire second cutting edge lies in the second peripheral edge surface.

20. The culling insert according to claim 19 wherein the first peripheral edge surface forms an angle between 5 and 30 degrees with the second peripheral edge surface.

21. The cutting insert according to claim 20 wherein the angle between the first peripheral edge surface and the second peripheral edge surface is between 10 and 20 degrees.

22. The cutting insert according to claim 21 wherein the angle between the first peripheral edge surface and the second peripheral edge surface is approximately 16±2 degrees.

23. The cutting insert according to claim 2 wherein the cutting edge constitutes a first cutting edge, the insert including a second cutting edge configured as a mirror image of the first cutting edge and formed at a transition between the peripheral edge surface and the bottom flank; wherein the first and second cutting edges lie in a common plane defined by the peripheral edge surface.

24. The cutting insert according to claim 23 wherein the top and bottom flanks together form an angle between 2 and 15 degrees.

25. The cutting insert according to claim 24 wherein the top and bottom surface together form an angle between 4 and 8 degrees.

* * * * *